Aug. 28, 1928.
L. H. KAUPKE
1,681,938
RUNNER OPENER
Filed Sept. 14, 1925
2 Sheets-Sheet 1
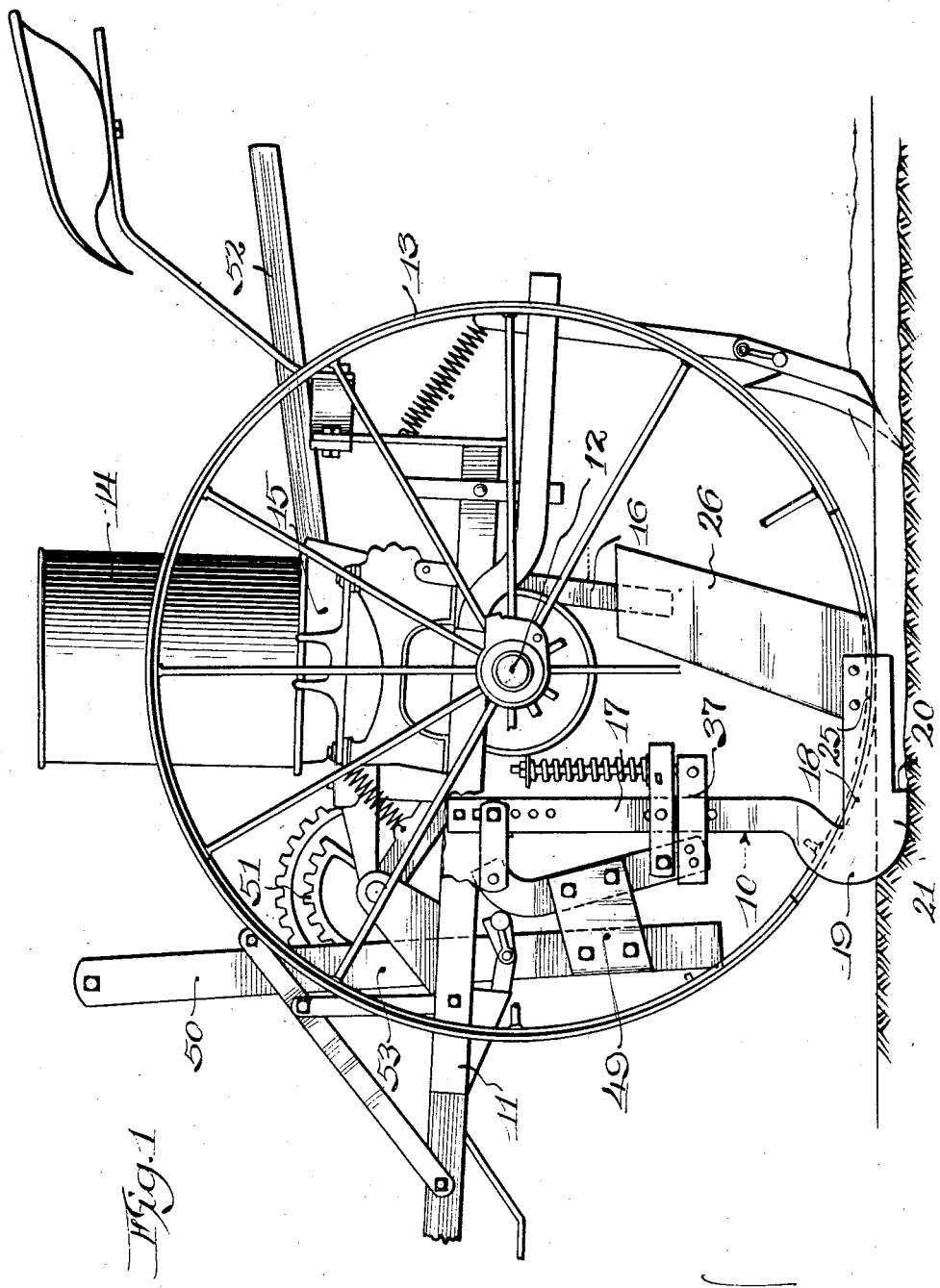
Inventor
Lee H. Kaupke Aug. 28, 1928.
L. H. KAUPKE
1,681,938
RUNNER OPENER
Filed Sept. 14, 1925 2 Sheets-Sheet 2
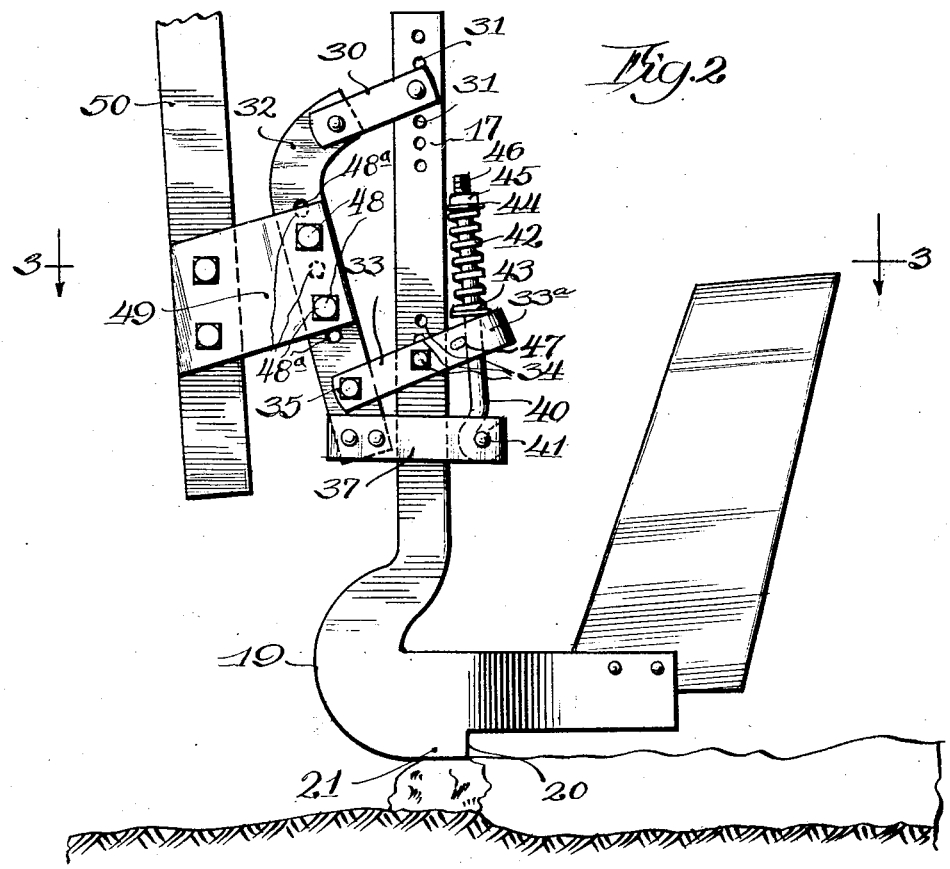
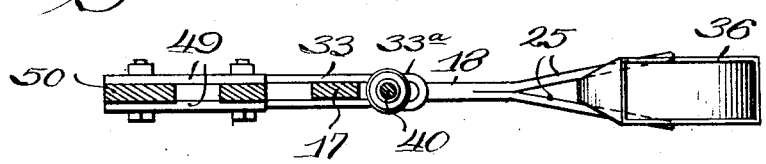

Patented Aug. 28, 1928.

1,681,938

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

RUNNER OPENER.

Application filed September 14, 1925. Serial No. 56,142.

This invention relates to improvements in runner openers adapted for use in connection with planters, listers, or the like, and has for its principal object to provide an improved form of runner opener for devices of the character described.

As heretofore constructed, runner openers have been extensively used for forming a trough in the ground for depositing the seed therein. Such openers usually consist of a knife-like blade arranged to form a V-shaped trough in the ground, and having a suitable chute carried immediately behind the blade and arranged to deposit the seed in said trough. As usually constructed, such runner openers consist of a vertically disposed standard or beam having a rearwardly curved blade portion at its lower end, and provided with yieldable connecting means for attachment to the frame so as to permit the lower end of the opener to swing rearwardly when it encounters solid or unyielding obstructions.

In my improved form of runner opener, I provide a new form in which the blade portion is curved forwardly and then rearwardly of the main upright or vertical standard so that the lowermost part of the cutting blade, usually referred to as the "skag", is substantially in vertical alinement with the vertically disposed support which is connected with the planter frame. I also provide a new and improved connecting means for said support, which means affords displacement of the runner opener substantially in a vertical direction, or longitudinally of the support, rather than being swung pivotally toward the rear, as in prior constructions. This arrangement is especially advantageous under some conditions in which the earth is very hard, making it possible to exert maximum pressure upon the runner opener by utilizing a large portion of the weight of the lister or planter, as well as the operator, directed upon the runner opener, as is sometimes necessary in order to open the ground. In my improved arrangement, therefore, the runner opener is always maintained in substantially vertical position so as to be maintained at the proper angle with respect to the ground.

The invention may best be understood by reference to the accompanying drawings illustrating a preferred embodiment thereof. In the drawings:

Figure 1 shows a typical lister or planter, with parts broken away to show a runner opener constructed in accordance with my invention;

Figure 2 is an enlarged detail view of the runner opener showing it in elevated form, as when it comes in engagement with an obstruction;

Figure 3 is a transverse sectional view taken on line 3—3 of Figure 2.

Referring now to details of my invention as shown in the accompanying drawings, a runner opener 10 is shown as applied to a typical lister or planter having a main frame 11 having an axle 12 provided with supporting wheels 13 of the usual construction. A seed can 14 is mounted on the main frame and provided with seed dropping mechanism indicated generally at 15 for automatically depositing seeds at desired intervals through a tube 16. Details of the automatic seed dropping mechanism are not shown as it forms no part of the present invention.

Referring now to the runner opener forming the subject matter of the invention, the same consists of a vertically disposed standard or beam 17 having a horizontally disposed part 18 formed at the lower end thereof and preferably integral with said standard. The runner is provided with a knife-like edge 19 curving forwardly from the vertical standard 17 and thence downwardly and rearwardly on said horizontal part where said knife-like edge terminates at a shoulder 20 at a point substantially in alinement with the rearmost line of the standard 17. This knife-like edge forms at its lowermost point what is commonly known as the "skag" of the runner opener herein indicated at 21, the skag being the part which forms the V-shaped furrow in the ground in which the seeds dropping from the tube 16 are deposited. The rear end of the horizontally disposed part 18 beyond the skag is bifurcated as clearly shown in Figure 3, forming two arms 25—25 between which is secured a chute 26. This chute fits over the tube 16 but is of sufficient size to permit movement of the runner opener relative to the main frame of the lister, as will hereinafter more fully appear. The arms 25—25 are arranged to restrain the dirt from falling into the furrow formed by the skag 21 until the seed has been deposited at the bottom of said furrow.

The runner opener is attached to the main frame by the following devices. A pair of links 30 are pivotally connected at one end in one of a series of holes 31—31 at the upper end of the standard 17, and at the other end to a member 32 forwardly of the latter. A second pair of links 33 are pivotally connected at one end in one of a series of holes 34—34 intermediate the ends of the member 17 and at the other end at point 35 with the member 32. The pair of links 30 are preferably arranged at opposite sides of the standard 17 and member 32, respectively, to operate in unison while the pair of links 33 are similarly arranged on opposite sides of the same members. A pair of arms 37—37 are fixed at their forward ends on opposite sides of the lower end of member 32 and extend rearwardly on opposite sides of the standard 17, but permitting vertical movement of said standard relative thereto. Tension means are provided tending to keep the rear ends of the arms 37 in parallel relation with the links 33. In the form shown, this means comprises an upwardly extending rod 40 pivoted between the ends of the arms 37 rearwardly of the standard 17 and passing upwardly between rearwardly extended portions 33ª of the pair of links 33, in the preferred form shown the links 33 and extensions 33ª being formed of a single U-shaped piece, as clearly shown in Figure 3. A coil spring 42 is arranged on the upper end of the rod 40 in a position tending to force the links 33 into position parallel with arms 37. The lower end of the spring 42 bears upon a washer 43 engaging the upper surface of the link extensions 33ª, while the upper end of said spring engages a washer 44 mounted for vertical adjustment by means of a nut 45 screwed on the threaded end portion 46 of said rod. A pin 47 is passed through links 33 forwardly of said rod to hold the latter in desired upright position.

The member 32 is supported with respect to the main frame 11 of the lister by any suitable means, as for instance, by means of a pair of arms 49—49 connected at their rear ends by bolts 48—48, fitting in a pair of a series of holes 48ª, 48ª, in the member 32, and connected at their forward ends with a member 50 arranged for vertical movement so as to control the depth of the runner opener, and also lift the latter out of operative position with respect to the ground when it is not in operation. Any suitable means for elevating the runner opener may be provided, in the form shown, the means comprising a segment 51 operated by lever 52, said segment engaging a rack of the usual form (not shown) adjacent the central part 53 of member 50.

Referring now to the operation of the device above described, it will be observed that when in operative position, as shown in Figure 1, the tension of spring 42 is such as to maintain the arms 30 and 33 in lowered position substantially parallel with each other and with the horizontally disposed arms 37. The tension of the spring 42 may be adjusted by means of the nut 45 on the upper end of rod 40 to maintain the runner opener at the desired depth under average operating conditions, depending upon the hardness of the ground and the amount of tension required to keep the skag at the desired depth. The parallel link motion afforded by arms 30 and 33 is such as to permit limited vertical movement of the runner opener when obstructions are encountered, although in the preferred form shown the upper link 30 is slightly longer than the lower link 33 so as to cause the runner opener to be swung with its lower end slightly forward of its normal vertical position, thus counteracting any tendency to incline said opener rearwardly. With an adjustable tension device as disclosed, it is possible under conditions where the ground is extremely hard to maintain a large proportion of the weight of the lister or planter, together with the operator, directly upon the runner opener and force it into the ground, but while operating under more normal conditions with relatively loose ground, the tension on the spring 42 may be relieved according to the pressure desired.

My improved formation of the sharpened blade portion 19, curved forwardly from the standard as shown, permits the placing of the skag 21 substantially in vertical alinement with the standard so that downward pressure upon said standard will be directly upon the skag. Furthermore, the arrangement of the curved forward margin 19 forming the runner opener blade forwardly of the standard 17, is more effective for forming the furrow and causes less reaction in a direction tending to throw the standard rearwardly than in the case of prior constructions in which the blade curves rearwardly directly from the standard and the skag is considerably rearward of the standard.

Adjustment of the depth of the runner with respect to the member 32 is afforded by means of the series of holes 31—31 and 34—34 in the standard 17, while a further adjustment of the member 32 with respect to the supporting member 50 is provided by means of the series of holes 48ª—48ª. The double adjustments provide means for accommodating the runner opener to different types of listers or planters and furthermore provide a wider range of adjustment than in the case of such adjustments on a single runner opener standard.

While I have illustrated and described one particular embodiment of my invention, it will be understood that I do not wish to be limited to the exact construction shown and described, but that various changes and modifications may be made without departing from the spirit and scope of my invention.

I claim as my invention:

1. A runner opener adapted for attachment to a planter, comprising a single vertically disposed standard and supporting means therefor, a horizontally disposed member connected therewith provided with a sharpened blade forming a skag, the extreme lower sharpened edge of said skag being substantially in vertical alinement with said standard and the point of connection with its supporting means.

2. A runner opener adapted for attachment to a planter, comprising a vertically disposed standard having at its lower end a sharpened marginal portion curved forwardly from said standard and then rearwardly, the extreme lower sharpened edge of said curved portion intersecting the longitudinal axis of said standard at a point substantially tangential thereto.

3. A runner opener adapted for attachment to a planter, comprising a single vertically disposed standard having a horizontally disposed member connected therewith and forming a skag, the extreme lower sharpened edge of said skag being substantially in vertical alinement with said standard, supporting means for said standard, and tension means permitting movement of said beam vertically relative to said support.

4. A runner opener adapted for attachment to a planter, comprising a vertically disposed standard having at its lower end a sharpened marginal portion curved forwardly and then rearwardly, and the extreme lower sharpened margin of said curved portion intersecting the longitudinal axis of said standard at a point substantially tangential thereto, supporting means for said standard, and tension means permitting movement of said standard vertically in parallel relation to said support.

5. A runner opener adapted for attachment to a lister or the like, comprising a vertically disposed standard having a blade at the lower end thereof, a support for said standard, and means interposed between said support and standard comprising tension means tending to maintain said standard in a predetermined position and means comprising a pair of parallel links permitting substantially vertical movement of said standard relative to said support, the upper link being longer than the lower link.

6. A runner opener adapted for attachment to a lister or the like, comprising a vertically disposed standard having a blade at the lower end thereof, a support for said standard, a pair of substantially parallel links connecting said standard and said support to permit relative vertical movement therebetween, and adjustable tension means tending to maintain said standard and support in a predetermined position.

7. A runner opener adapted for attachment to a lister or the like, comprising a vertically disposed standard having a blade at the lower end thereof, a support for said standard, a pair of substantially parallel links connecting said standard and said support to permit relative vertical movement therebetween, and adjustable tension means tending to maintain said standard and support in a predetermined position, comprising a compression spring cooperating between one of said links and said support.

8. A runner opener adapted for attachment to a lister or the like, comprising a vertically disposed standard having a blade at the lower end thereof, a support for said standard, a pair of substantially parallel links connecting said standard and said support to permit relative vertical movement therebetween, and adjustable tension means tending to maintain said standard and support in a predetermined position, comprising a vertically disposed rod connected to a portion of said support extending on the side of said standard opposite said links, and a compression spring cooperating between said rod and an extension of one of said links.

9. A runner opener adapted for attachment to a lister or the like, comprising a vertically disposed standard having a blade at the lower end thereof, a support for said standard, a pair of substantially parallel links connecting said standard and said support to permit relative vertical movement therebetween, an arm for attachment of said support to a lister, adjustable securing means for said support comprising bolts and a series of holes arranged vertically of said support, and other adjustment means comprising two series of vertically adjustable pivot points on said standard adapted for engagement by said parallel links.

Signed at Rock Island, Ill., this 9th day of September, 1925.

LEE H. KAUPKE.